United States Patent
Choo et al.

(10) Patent No.: US 6,542,330 B1
(45) Date of Patent: Apr. 1, 2003

(54) DISC CLAMP FOR IMPROVED DISC STACK BALANCE

(75) Inventors: Chi Siang Victor Choo, Singapore (SG); Boon Seng Ong, Singapore (SG); Poh Lye Lim, Singapore (SG); Niroot Jierapipatanakul, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 324 days.

(21) Appl. No.: 09/607,348

(22) Filed: Jun. 30, 2000

Related U.S. Application Data

(60) Provisional application No. 60/141,612, filed on Jun. 30, 1999.

(51) Int. Cl.[7] .............................................. G11B 17/022
(52) U.S. Cl. ................................ 360/99.12; 360/98.08; 369/270
(58) Field of Search ......................... 360/98.02, 98.08, 360/99.05, 99.12; 369/270

(56) References Cited

U.S. PATENT DOCUMENTS

| | | | |
|---|---|---|---|
| 4,125,883 A | | 11/1978 | Rolph |
| 4,864,443 A | | 9/1989 | Peterson |
| 5,243,481 A | | 9/1993 | Dunckley et al. |
| 5,274,517 A | * | 12/1993 | Chen .................... 360/98.08 |
| 5,296,981 A | | 3/1994 | Ogawa |
| 5,452,157 A | | 9/1995 | Chow et al. |
| 5,528,434 A | * | 6/1996 | Bronshvatch et al. .... 360/98.08 |
| 5,590,004 A | | 12/1996 | Boutaghou |
| 5,790,346 A | * | 8/1998 | Fletcher .................... 360/99.12 |
| 5,872,682 A | * | 2/1999 | Saichi et al. ............. 360/99.12 |
| 5,880,905 A | | 3/1999 | Kazmierczak et al. |
| 5,880,906 A | * | 3/1999 | Lindrose .................. 360/98.08 |
| 6,028,739 A | * | 2/2000 | Lindrose .................. 360/99.12 |
| 6,226,146 B1 | * | 5/2001 | Landess et al. .......... 360/98.08 |

FOREIGN PATENT DOCUMENTS

| | | |
|---|---|---|
| EP | 0 226 378 B1 | 6/1987 |
| EP | 0 255 166 B1 | 2/1988 |
| JP | U82831 | 6/1981 |
| JP | 97-169436 | 6/1997 |
| JP | 9-223346 * | 8/1997 |
| JP | 10-162464 * | 6/1998 |
| JP | 11-86486 * | 3/1999 |

* cited by examiner

Primary Examiner—David L. Ometz
(74) Attorney, Agent, or Firm—Derek Berger

(57) ABSTRACT

A disc clamp for a disc drive used to secure a disc stack in position when the disc is mounted to a hub. The disc clamp is annular with a central opening and has three tabs. The three equidistantly spaced tabs extend radially inward from the circumferential edge of the central opening. The disc clamp is resiliently flexible and has a continuous annular disc contact region adjacent to an outer circumferential edge. The disc clamp also has at least three screw openings each for receiving a screw fastener to fasten the disc clamp to the hub in the clamping position. The disc clamp resiliently flexes in the clamping position to cause the annular disc contact region to bear against the surface of the outermost stacked disc to clamp the disc stack against radial and axial movement.

14 Claims, 5 Drawing Sheets

DISC CLAMP FOR IMPROVED DISC STACK BALANCE

This patent application claims priority from U.S. Provisional Application No. 60/141,612 filed Jun. 30, 1999.

FIELD OF THE INVENTION

The present invention relates generally to disc drives. More particularly, the present invention relates to a disc clamp for a disc drive and a disc drive that includes such a disc clamp.

BACKGROUND OF THE INVENTION

Disc drives generally include a drive hub or spindle that can be driven to rotate by a suitable motor to drive a magnetic or optical data storage disc or discs about the axis of the hub or spindle. Where the disc drive includes more than a single disc it is said to include a disc stack assembly (DSA), in which the discs are stacked substantially coaxially in spaced-apart relationship relative to the hub. In either arrangement, it is necessary to employ a clamping mechanism to clamp the disc or discs securely in position against axial and radial movement. The propensity for such movement is most likely during acceleration and deceleration of the hub, and when the disc drive is subject to shock loads, such as may occur during movement from one location to another, or if the disc drive is knocked. Thus the clamping mechanism must exert a firm clamping force to resist undesirable movement of the above kind. Examples of clamping mechanisms suitable for use in disc drives, can be found in the specification of U.S. Pat. Nos. 4,864,443, 5,243,481, 5,590,004 and 5,880,905.

Once the particular clamping mechanism employed has been applied, the disc or discs of the disc drive are fixed in position, such that any eccentric misalignment of one or more of the discs is permanent. Any misalignment can affect the performance of the disc drive by generating eccentric loads, which can affect the accuracy of the read signal taken from each disc. Therefore, it is important that the discs be balanced prior to the application of the clamping mechanism.

One arrangement for balancing a DSA is to bias successive discs in opposite directions against the outer surface of the hub. In this arrangement, an eccentric force generated by one disc of the DSA is balanced by a substantially equal and opposite eccentric force generated by the next disc in the DSA. However in this arrangement, significant unbalanced eccentric forces can still arise during rotation of the DSA by eccentric misalignment of the disc clamp. A need exists to provide a disc clamp arrangement which substantially reduces or eliminates eccentric forces generated by the disc clamp in a disc drive arrangement of this kind. The present invention meets this need and offers other advantages not proposed or recognized in the prior art.

SUMMARY OF THE INVENTION

The present invention relates to the use of a disc clamp in a disc drive which meets the above mentioned need and offers other advantages over the prior art.

In accordance with one embodiment of the invention there is provided a disc drive having a drive hub which is rotatable about an axis, a motor for driving the hub about its axis, at least two spaced apart discs which are axially stacked about the hub, and a disc clamp. The disc clamp is of annular plate form defining a central, circular opening and includes at least three radially inwardly extending tabs depending from the circumferential edge of the central opening, which are spaced substantially equidistantly thereabout. The radial inward extent of each of the tabs is substantially equal and is arranged so that with the disc clamp in the clamping position and in coaxial alignment with the hub, the radially innermost edge of the tabs is closely adjacent but spaced from the outer surface of the hub. The disc clamp is resiliently flexible and includes a continuous, annular disc contact region adjacent the outer circumferential edge of thereof. The disc further includes at least three screw openings each for receiving a screw fastener for fastening the disc clamp to the hub in the clamping position. In the clamping position of the disc clamp, the disc resiliently flexes to cause the annular disc contact region to bear against the surface of the outermost stacked disc to clamp the disc stack against radial and axial movement.

Another embodiment of the present invention provides a disc clamp with frustoconical cross-section, such that the annular disc contact region is below the central opening when the disc clamp is viewed in a horizontal plane. The annular disc contact region is formed by a continuous channel formed adjacent the outer circumferential edge of the disc clamp, which presents a curved contact surface for contact with the facing surface of a disc of the disc stack.

In a different embodiment, the corners of each of the three tabs are rounded to minimize particle debris which may be created when the hub it comes into contact with the tabs during operation.

In another embodiment, the disc clamp is formed by a metal stamping process.

In another embodiment, the disc clamp is formed by a machining process.

In yet another embodiment, the radially innermost edge of the tabs is spaced from the outer axial surface of the hub by a distance in the range 0.002" and 0.0005", when the disc clamp is fastened to the hub in an operative condition.

Another aspect of the present invention provides a disc clamp which includes assembly openings arranged for receipt of assembly pins for positioning the disc clamp in place during assembly. It is preferable that three assembly openings are provided, with each being disposed between a pair of screw openings.

DETAILED DESCRIPTION OF INVENTION

Figure 1:
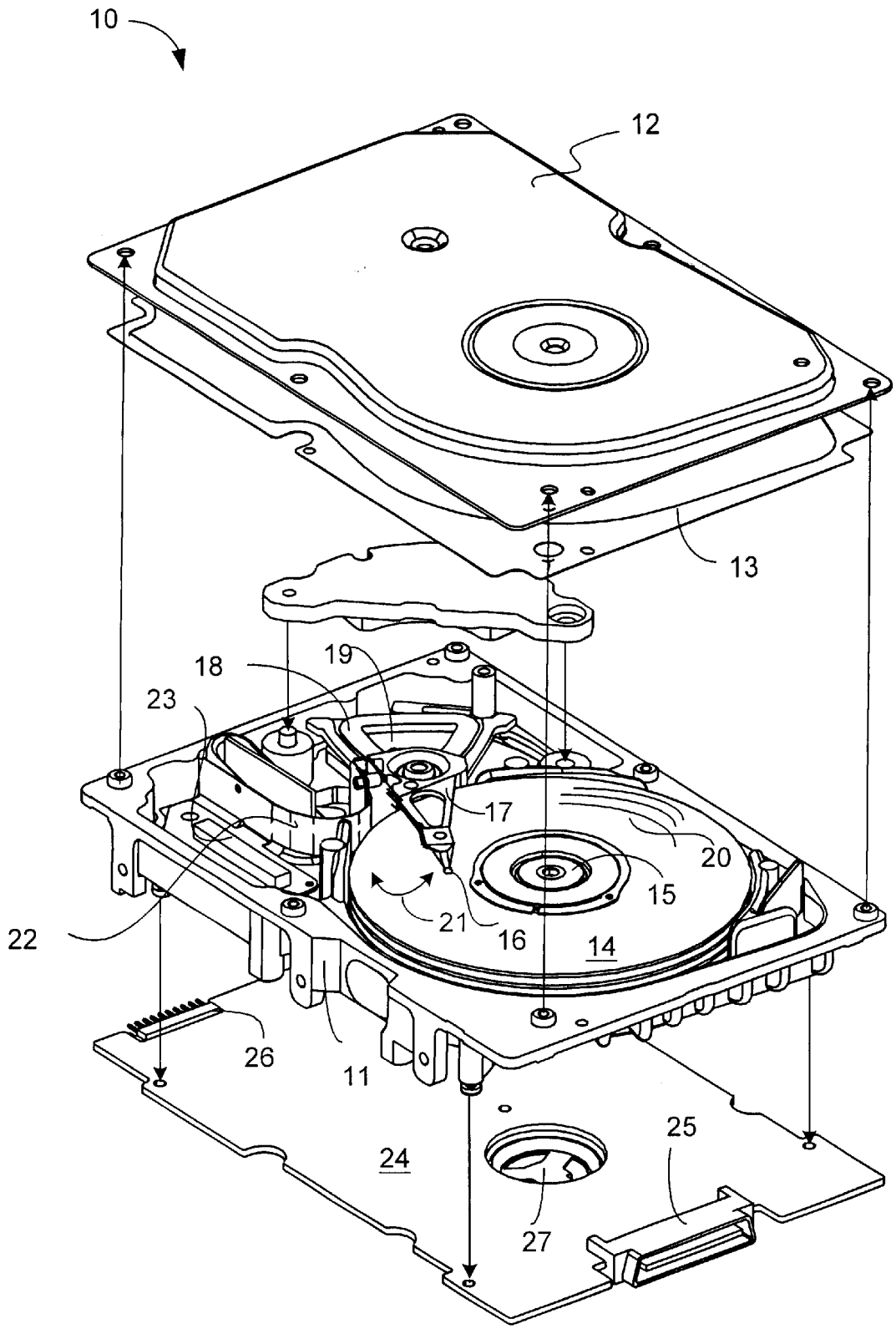
FIG. 1 is an exploded view of a typical disc drive.

FIG. 1 shows a typical disc drive 10 in exploded view. Briefly, the disc drive 10 includes a housing base 11 and a top cover 12, which engage a gasket 13 to form a sealed housing that maintains a clean environment inside the disc drive 10. A plurality of discs 14 is mounted for rotation on a spindle motor hub 15. A plurality of transducer heads 16 is mounted to an actuator body 17. The actuator body 17 is adapted for pivotal motion under control of a voice coil motor (VCM) including a voice coil 18 and magnets 19 to controllably move a head 16 to a desired trace 20 along an arcuate path 21. Signals used to control the VCM and the heads 16 pass via a flex circuit 22 and a connector 23 to and from electronic circuitry on controller board 24. The controller board 24 includes a fiber channel interface 25, a serial port connector 26 and a hub connector 27. The actuator assembly which includes the actuator body 17 and transducers 16 is mounted on the base 11 via a pivot mechanism, sometimes termed a pivot cartridge.

In the disc drive 10 of FIG. 1, the discs 14 may be mounted on the hub in any suitable manner, but care must be taken to balance the disc stack assembly (DSA) to minimize eccentric forces generated when the hub rotates. One method of achieving this is to bias successive discs 14', 14" in opposite directions against the hub and FIG. 2 is illustrative of such an arrangement.

Figure 2:
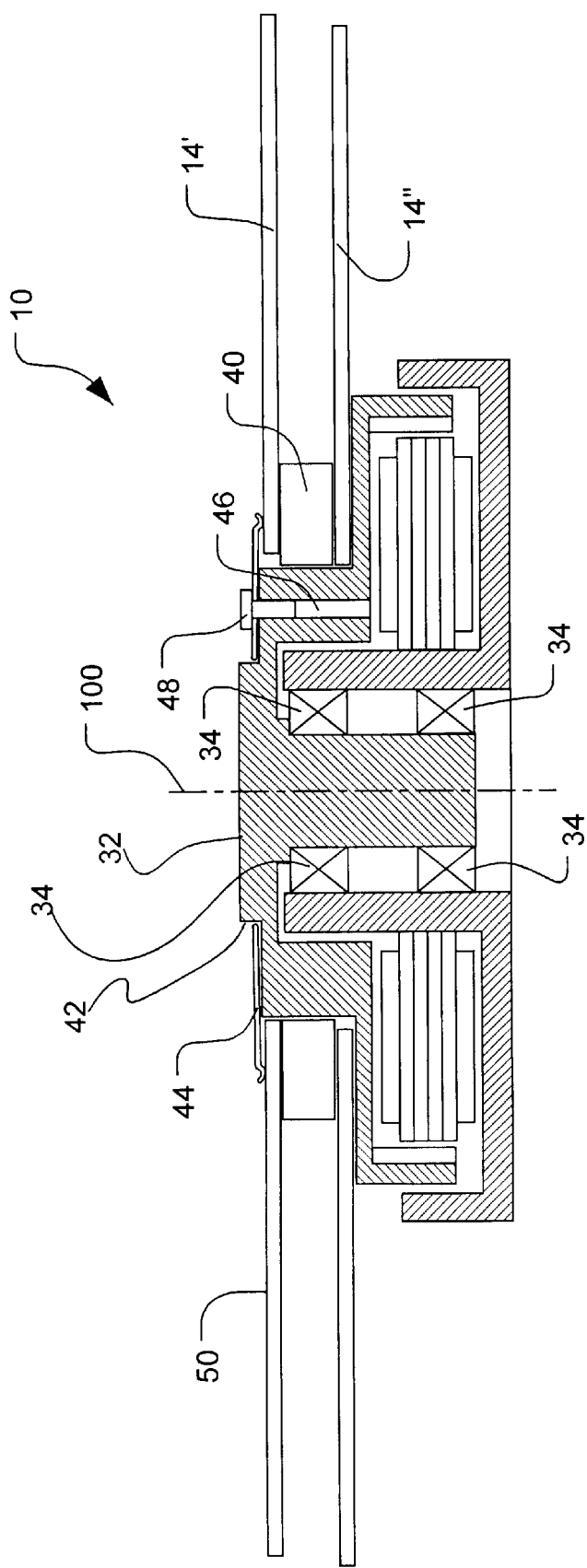
FIG. 2 is a cross-sectional view of a disc drive employing a disc clamp according to one embodiment of the present invention.

In FIG. 2, the disc drive 10 includes a hub 15 mounted for rotation on bearings 34 about an axis 100. The disc drive 10 includes a pair of discs 14', 14" which are axially spaced apart by a spacer 40. Each of the discs 14', 14" engages the outer circumferential surface 42 of the hub 15 at opposite sides. This arrangement can be clearly seen in FIG. 2, in which the disc 14' engages the left-hand side of the hub 15, while the disc 14" engages the right-hand side of the hub 15. In this manner, an eccentric force generated during rotation of the disc 14' is counter balanced by a substantially equal and opposite eccentric force generated by the disc 14".

FIG. 2 also shows a disc clamp 44 according to the present invention. The disc clamp 44 is shown in plan view in FIG. 3 and reference will now be made to that figure. The disc clamp 44 is of annular form, having an outer circumferential edge 58 and an internal opening 56 defined by an internal circumferential edge 53.

The internal opening 56 includes three radially inwardly depending tabs 54', 54", 54'". Each of the tabs 54', 54", 54'" extends radially inwardly substantially the same amount and is spaced substantially equidistantly about the internal edge 53. The tabs 54', 54", 54'" are provided to facilitate accurate coaxial alignment of the disc clamp 44 relative to the axis 100 of the hub 15 to minimize eccentric forces generated by axial misalignment of the disc clamp 44 during rotation of the hub 15. The tabs 54', 54", 54" ensure that the disc clamp 44 is mounted substantially coaxially relative to the hub 15, by reducing the amount of available movement between the inner edge 53 of the tabs 54', 54", 54'" and the outer surface 42 of the hub 15. That is, when the disc clamp 44 is fitted to the hub 15, the tabs 54', 54", 54'" reduce the available radial movement of the disc clamp 44 relative to the hub 15, so that eccentric misalignment of the disc clamp 44 can be maintained within a range that minimizes eccentric forces generated during rotation of the DSA. In a perfect arrangement, the disc clamp 44 would be mounted on the hub 15 absolutely coaxially, but in practice, that can rarely occur. Thus, during assembly, the tabs 54', 54", 54" may engage the outer surface 42 of the hub 15, but by that engagement, the eccentricity of the disc clamp 44 is advantageously minimized. Normally there will still be some eccentricity, but, by virtue of the tabs 54', 54", 54'", the level of eccentricity can be minimized to an acceptable level. The tabs 54', 54", 54'" have rounded corners to minimize particle debris that maybe created on contact with the hub 15 during operation.

The disc clamp 44 further includes three screw fastener openings 52', 52", 52'" for receipt of screw fasteners to fasten the disc clamp to the hub 15. This arrangement is shown in FIG. 2, whereby the hub 15 includes a screw threaded opening 46 for receiving a screw fastener 48. The hub 15 of course, includes three such openings to match the openings 52', 52", 52'" of the disc clamp 44.

Attachment of the disc clamp 44 to the hub 15 by screw fasteners 48 axially loads the disc clamp against the upper surface 50 of the disc 14'. The axial load that can be applied is such as to clamp each of the discs 14, 14' against axial and radial movement relative to the axis 100.

Figure 4:
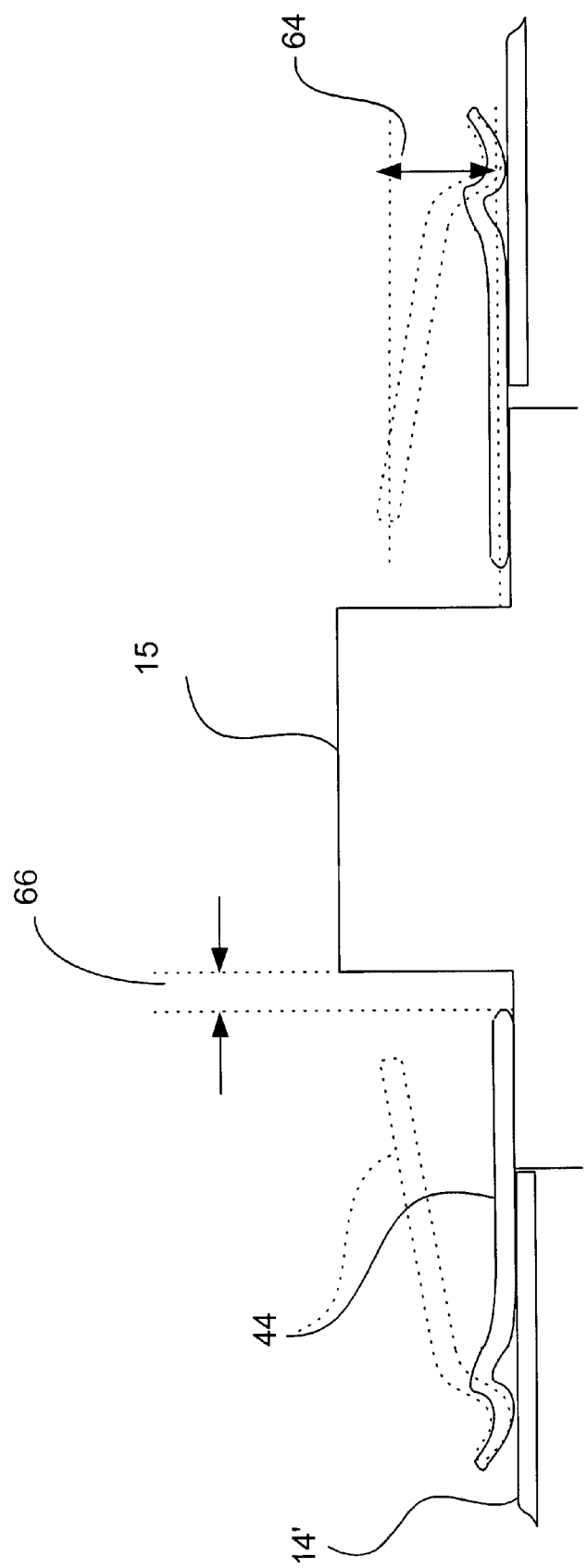
FIG. 4 is a cross-sectional view of a disc clamp of the kind shown in FIG. 3.

The disc clamp 44, prior to installation as shown in FIG. 2, is of frustoconical form and this is more clearly illustrated in FIG. 4, which shows two views of the disc clamp before and after the screw fasteners 48 have been applied. The before view is shown in dot outline while the arrangement of FIG. 4 is exaggerated for illustrative purposes. As shown in FIG. 4, the disc clamp 44 undergoes radial and axial deflection between the free and fastened positions. The amount of axial deflection 64 is governed by the axial clamping force required, while the amount of radial deflection 66 is limited by the requirement to minimize eccentric loading of the disc stack assembly (DSA) by the disc clamp 44. The maximum allowable radial deflection 66 preferably is between 0.002" and 0.0005" (0.050 mm to 0.0127 mm), where the nominal clearance is at 0.002" (0.050 mm) and in a worst-case scenario the clearance is at 0.0005" (0.0127 mm).

The disc clamp 44 is formed in a manner that permits resilient flexibility and the preferred method of formation is by stamping. The disc clamp 44 resiliently flexes between the free and fastened positions shown in FIG. 4.

Figure 3:
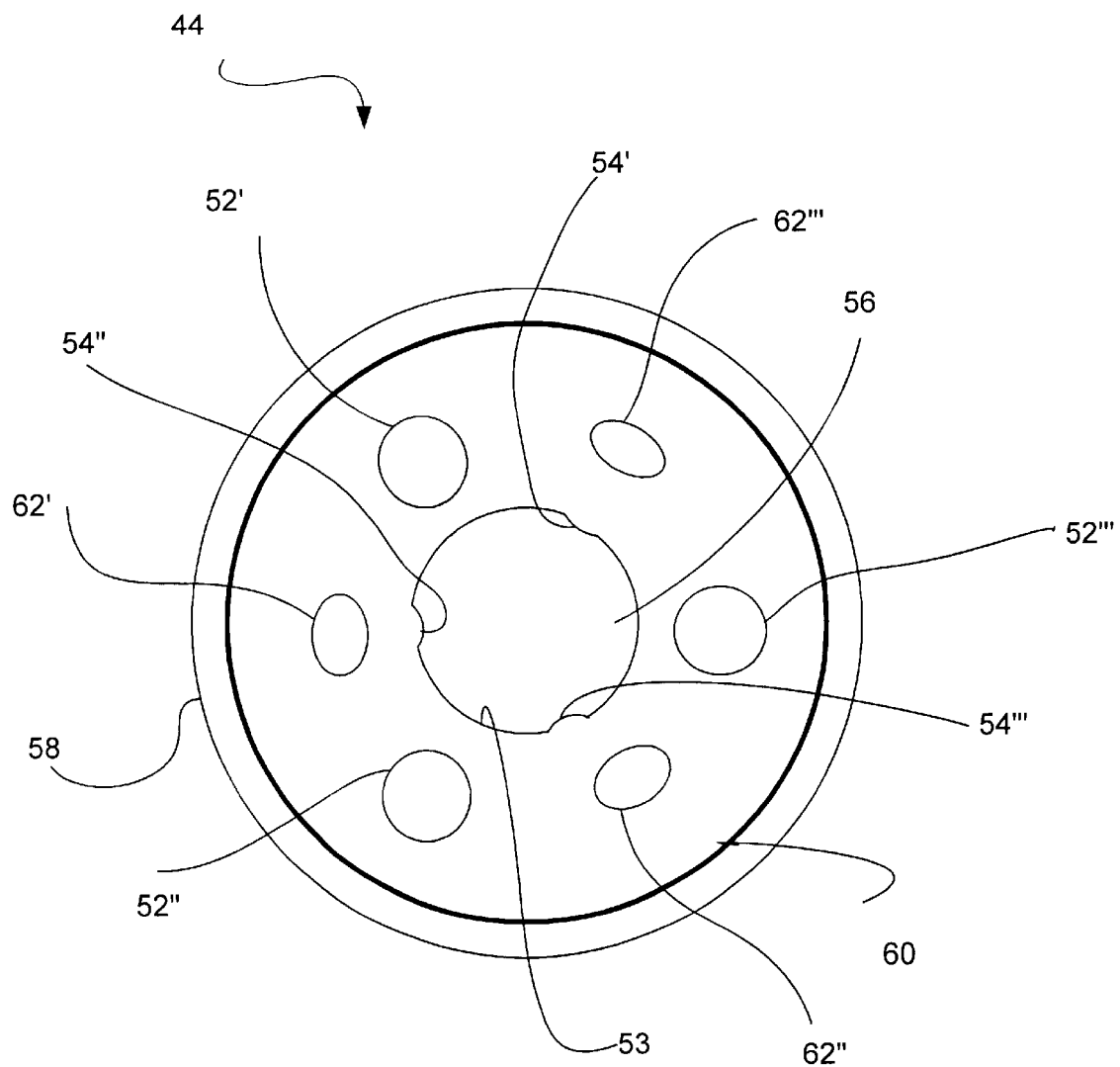
FIG. 3 is a plan view of a disc clamp according to one embodiment of the invention.

The disc clamp 44 engages the upper surface 50 of the disc 14' toward the outer circumferential edge 58. Referring to FIGS. 3 and 4, the disc clamp 44 is formed with an annular channel 60 that is of U-shaped cross-section. The contact region of the disc clamp is arranged to be minimized so that the contribution of the disc clamp to the DSA in terms of eccentric loading is minimized. The contact region therefore is provided by an annular, substantially point contact as shown.

The arrangement shown in FIG. 2 advantageously provides a disc clamp 44 which can be accurately fitted to the hub 15 of a disc drive without excessive eccentric misalignment and which can be arranged to exert appropriate axial loading on the disc stack by the extent to which the fastening screws cause the disc clamp to resiliently flex.

In FIG. 4, the radially inward section of the disc clamp is relaxed to permit return movement in an anti-clockwise direction, while the radially outer edge is moved downwardly so that there is engagement between the underside of the channel 60 and the upper surface 50 of the disc 14', as well as possible engagement between the one or two of the tabs 54', 54", 54'" and the surface 42 of the hub 15. That latter engagement serves to align the disc clamp 44 on the hub 15 within the accepted radial tolerance range of between 0.002" and 0.0005" (0.050 mm to 0.0127 mm) from the surface 42. In FIG. 9, the screws are applied within each of the screw openings 52', 52", 52'" to maintain the disc clamp 44 axially clamped against the disc 14'.

The elliptical openings 62', 62", 62'" shown in FIG. 3 facilitate assembly of the disc clamp 44 into the clamping position. Each of those openings 62', 62", 62'" accepts a tooling pin (not shown) for generally aligning the disc clamp 44 relative to the hub 15, after which the tabs 54' 54", 54'" ensure proper alignment.

Figure 5:
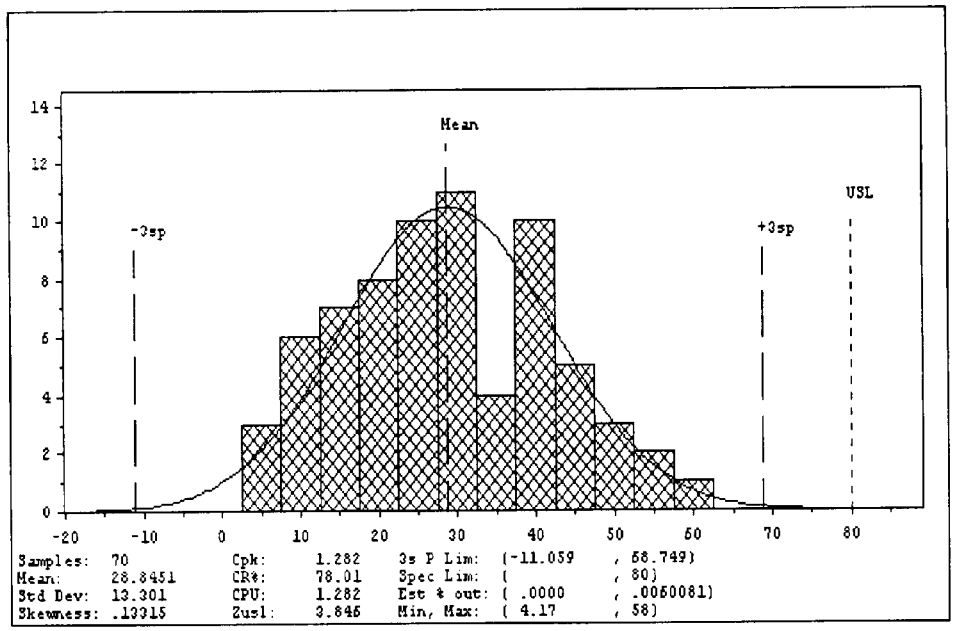
FIG. 5 is a $C_{pk}$ chart showing the process capability of an existing disc clamp (piror art).
Figure 6:
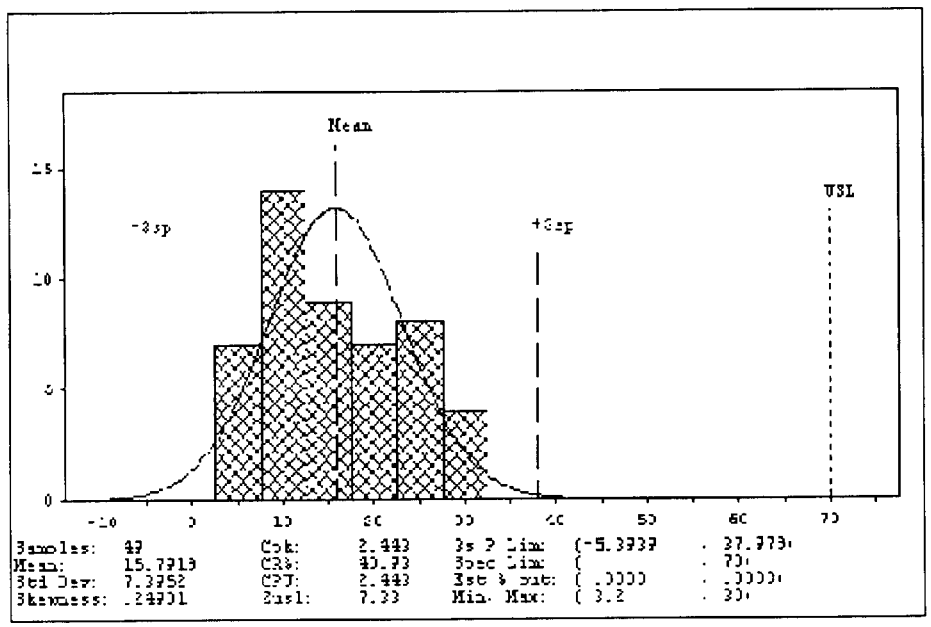
FIG. 6 is a $C_{pk}$ chart showing the process capability of the three-tab disc clamp in the present invention.

The advantage of the invention is seen in the Process Capability Index $C_{pk}$ shown in the Tables 1 and 2 in which Table 1 represents the existing disc clamp design and Table 2 represents the disc clamp design of the present invention. The disc clamp of the invention realized a $C_{pk}$ of approximately double that of the existing disc clamp design. The results in Table 1 and Table 2 were obtained from the charts in FIG. 5 and FIG. 6 respectively.

TABLE 1

| Sample Size | Mean. | Standard Deviation. | Min. | Max. | $C_{pk}$ |
|---|---|---|---|---|---|
| 70 | 28.8 mg | 13.3 mg | 4.2 mg | 58 mg | 1.282 |

TABLE 2

| Sample Size | Mean. | Standard Deviation. | Min. | Max. | $C_{pk}$ |
|---|---|---|---|---|---|
| 49 | 15.8 mg | 7.39 mg | 3.2 mg | 30 mg | 2.443 |

Another method to describe the present invention is as follow:

The present invention provides a disc drive with a drive hub 15, a motor for driving the hub 15, two spaced apart discs 14, 14' which are axially stacked about the hub 15, and a disc clamp 44. The drive hub 15 is rotatable about an axis 100 while the disc clamp 44 is of annular form defining a central, circular opening 56 which has three radially inwardly extending tabs 54', 54", 54'" depending from the circumferential edge of the central opening 56. These tabs 54', 54", 54'" are spaced substantially equidistantly from each other, the radial inward extent of each of the tabs 54; 54", 54'" is substantially equal and is arranged so that with the disc clamp 44 in the clamping position and in co-axial alignment with the hub 15. The radially inner- most edge of the tabs 54', 54", 54'" is closely adjacent, but spaced from the outer surface of the hub 15. The disc clamp 44 is resiliently flexible and includes a continuous annular disc contact region adjacent the outer circumferential edge 58 and three screw openings 52', 52", 52'". Each opening is for receiving a screw fastener 48 for fastening the disc clamp 44 to the hub 15 in the clamping position where the disc clamp 44 is resiliently flexed in the clamping position. This arrangement cause the annular disc contact region to bear against the surface of the outermost stacked disc to clamp 44 the disc stack against radial and axial movement. The disc clamp 44, formed by a metal stamping process, is frustoconical in cross-section, such that the annular disc contact region is below the central opening 56 when the disc clamp 44 is viewed in a horizontal plane. The annular disc contact region is formed by a continuous channel 60 formed adjacent the outer circumferential edge 58 of the disc clamp 44, which presents a curved contact surface for contact with the facing surface of a disc 14 of the disc stack. The radially inner-most edge of each of the tabs 52', 52", 52'" is spaced from the outer axial surface of the hub 15 by a distance in the range of 0.002" to 0.0005" (0.050 mm to 0.0127 mm) when the disc clamp 44 is fastened to the hub 15 in an operative condition.

In another embodiment of the invention, a disc clamp 44 has an annular form defining a circular opening 56 in the center where three tabs 54', 54", 54'" extends inwardly in a radial manner. The three tabs 54', 54", 54'" depends from the circumferential edge 58 of the central opening 56, are spaced equidistantly. The radial inward extent of each of the tabs 54', 54", 54'" are substantially equal and is arranged so that the radially innermost edge of each of the tabs 54', 54", 54'" are closely adjacent. The radially innermost edge is spaced from the outer surface of a disc drive hub 15, the disc clamp 44 is resiliently flexible and has a continuous annular disc contact region adjacent the outer circumferential edge 58. The disc clamp 44 also has three screw openings 52', 52", 52'", each for fastening the disc clamp 44 in a clamping position relative to the drive hub 15 and discs 14, 14' of the disc drive 10. The disc clamp 44, formed by a metal stamping process, has a frustoconical cross-section such that the annular disc contact region is below the central opening 56 when the disc clamp 44 is viewed in a horizontal plane. The annular disc contact region of the disc clamp 44 is formed by a continuous channel formed adjacent the outer circumferential edge 58 of the disc clamp 44, which presents a curved contact surface for contact with the facing surface of a disc 14 of a disc stack. The disc clamp 44 also has assembly openings 62', 62", 62'" for facilitating assembly in a disc drive 10, the assembly openings 62', 62", 62'" each being arranged for receipt of an assembly pin for positioning the disc clamp 44 in place. The tabs 54', 54", 4'" of the disc clamp 44 have rounded corners. The disc clamp 44 has three assembly openings, each positioned between a pair of screw openings 62', 62", 62'".

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc clamp while maintaining substantially the same functionality without departing from the scope and spirit of the present invention. In addition, although the preferred embodiment described herein is directed to a disc drive, it will be appreciated by those skilled in the art that the teachings of the present invention can be applied to other systems, like disc drive systems, without departing from the scope and spirit of the present invention.

What is claimed is:

1. A disc drive comprising:
   a drive hub which is rotatable about an axis;
   a motor for driving the hub about its axis;
   a disc stack comprising at least two spaced apart discs which are axially stacked about the hub; and
   a resiliently flexible disc clamp which is of annular form defining a central opening, wherein the disc clamp includes:
   at least three screw openings, each screw opening configured to receive a screw fastener for fastening the disc clamp to the hub in a clamping position,
   a continuous annular disc contact region adjacent an outer circumferential edge of the disc clamp;
   three radially inwardly extending tabs depending from and spaced substantially equidistantly thereabout a circumferential edge of the central opening; and
   a radial inward extent of each of the tabs being arranged so that when the disc clamp is placed in a clamping position and is in co-axial alignment with the hub, the radial inward extent of each tab is adjacent and spaced from an outer surface of the hub such that the disc clamp may resiliently flex when in the clamping position to cause the annular disc contact region to bear against a surface of an outermost stacked disc to clamp the disc stack against radial and axial movement.

2. The disc drive of claim 1, wherein the disc clamp has a frustoconical cross-section such that the annular disc contact region is below the central opening when the disc clamp is viewed in a horizontal plane.

3. The disc drive of claim 1, wherein the disc clamp is formed by a metal stamping process.

4. The disc drive of claim 1, wherein the annular disc contact region is formed by a continuous channel formed adjacent the outer circumferential edge of the disc clamp, which presents a curved contact surface for contact with the facing surface of the outermost stacked disc of the disc stack.

5. The disc drive of claim 1, wherein the radially innermost edge of each of the tabs is spaced from the outer axial surface of the hub by a distance in the range of 0.002" to 0.0005" (0.050 mm to 0.0127 mm) when the disc clamp is fastened to the hub in an operative condition.

6. A resiliently flexible disc clamp for use in a disc drive, the disc clamp having an annular form defining a central opening, comprising:

at least three screw openings, each screw opening configured to receive a screw fastener for fastening the disc clamp to a drive hub and discs of the disc drive in a clamping position, a continuous annular disc contact region adjacent an outer circumferential edge of the disc clamp;

three radially inwardly extending tabs depending from and spaced substantially equidistantly thereabout a circumferential edge of the central opening; and a radial inward extent of each of the tabs being arranged so that in use the radial inward extent of each tab is adjacent and spaced from an outer surface of the hub.

7. The disc clamp of claim 6, and wherein a cross-section is frustoconical, such that the annular disc contact region is below the central opening when the disc clamp is viewed in a horizontal plane.

8. The disc clamp of claim 6, and being formed by a metal stamping process.

9. The disc clamp of claim 6, and being formed by machining process.

10. The disc clamp of claim 6, wherein the annular disc contact region is formed by a continuous channel formed adjacent the outer circumferential edge of the disc clamp, which presents a curved contact surface for contact with the facing surface of a disc of a disc stack.

11. The disc clamp of claim 6 wherein the tabs of the clamp have rounded corners.

12. The disc clamp of to claim 6, further including assembly openings for facilitating assembly in a disc drive, the assembly openings each being arranged for receipt of an assembly pin for positioning the disc clamp in place.

13. The disc clamp of claim 12, including three assembly openings, each being positioned between a pair of screw openings.

14. A disc drive comprising:

a hub;

a base;

at least one rotatable disc; and means for securing the at least one rotatable disc to the base of the disc drive through the hub such that eccentricity is minimized.

* * * * *